(12) United States Patent
Dash et al.

(10) Patent No.: US 10,880,797 B2
(45) Date of Patent: *Dec. 29, 2020

(54) DEVICE AND METHOD FOR RADIO CELL SELECTION

(71) Applicant: Apple Inc., Cupertino, CA (US)

(72) Inventors: Deepak Dash, Khordha (IN); Nitin Gowda Basavarajappa, Santa Clara, CA (US); Gurunadha Rao Kota, Bangalore (IN); Nitin Kuppelur, Bangalore (IN)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/520,752

(22) Filed: Jul. 24, 2019

(65) Prior Publication Data

US 2020/0037215 A1    Jan. 30, 2020

Related U.S. Application Data

(63) Continuation of application No. 15/720,447, filed on Sep. 29, 2017, now Pat. No. 10,405,249.

(51) Int. Cl.
| | |
|---|---|
| *H04W 36/00* | (2009.01) |
| *H04W 48/20* | (2009.01) |
| *H04W 48/16* | (2009.01) |
| *H04W 48/18* | (2009.01) |
| *H04W 88/06* | (2009.01) |
| *H04W 36/30* | (2009.01) |

(52) U.S. Cl.
CPC .. *H04W 36/0083* (2013.01); *H04W 36/00835* (2018.08); *H04W 48/16* (2013.01); *H04W 48/18* (2013.01); *H04W 48/20* (2013.01); *H04W 36/0022* (2013.01); *H04W 36/30* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 10,405,249 B2 * | 9/2019 | Dash | H04W 48/16 |
| 2007/0004445 A1 | 1/2007 | Dorsey et al. | |
| 2014/0066072 A1 | 3/2014 | Carlsson | |
| 2016/0192251 A1 | 6/2016 | Chebolu et al. | |

* cited by examiner

*Primary Examiner* — Erika A Washington
(74) *Attorney, Agent, or Firm* — Eschweiler & Potashnik, LLC

(57) ABSTRACT

This disclosure relates to a mobile device, comprising: a receiver configured to receive a radio signal comprising transmissions from a plurality of radio cells; and a processor configured to derive second information from the received radio signal, the second information indicating at least one neighboring radio cell, wherein the processor is configured to initiate a radio cell selection based on the second information if the second information indicates at least one neighboring radio cell configured for the first RAT.

25 Claims, 5 Drawing Sheets

DEVICE AND METHOD FOR RADIO CELL SELECTION

FIELD

The disclosure relates to a mobile device which performs initiating a radio cell selection in a communication network and a method for initiating a radio cell selection, in particular a self-configured high priority radio access technology (RAT) search. The disclosure further relates to fallback techniques between different radio access technologies.

BACKGROUND

In current mobile communications 100, e.g. according to the 3GPP standard, when a mobile device 120 or User Equipment (UE) is in IDLE mode it performs neighboring inter-RAT cell measurement 121, 122, 123 and re-selects the best available cell found during the scanning as shown in FIG. 1. Depending on the network, UE 120 obtains an available inter-RAT (IRAT) neighbor cell list, e.g. including radio cells 111, 112, 113, and only the cells from this neighbor cell list are regularly monitored by the UE 120 to find the best cell for re-selection. The network usually broadcasts this information on broadcast channels, for example, in a neighbor cell list indicating radio cells configured for specific Radio Access Technologies (RAT). It has shown from field trials that in most situations such an inter-RAT neighbor cell list is not correctly configured. As the UE 120 is completely dependent on the broadcasted neighbor cell list, even when it is aware of the cells of the preferred RAT (for example cell 111 configured for LTE, Long Term Evolution) in its vicinity where it camped previously, it may be stuck in that same low priority RAT (for example a 2G-GSM cell) due to a wrongly configured IRAT neighbor cell list. This in turn drastically reduces the data throughput performance of a multi-mode LTE capable UE even though the user is subscribed for LTE data services and a suitable LTE cell is available in its vicinity.

Hence, there is a need to improve the cell search in particular in communication networks with radio cells configured for different radio access technologies.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
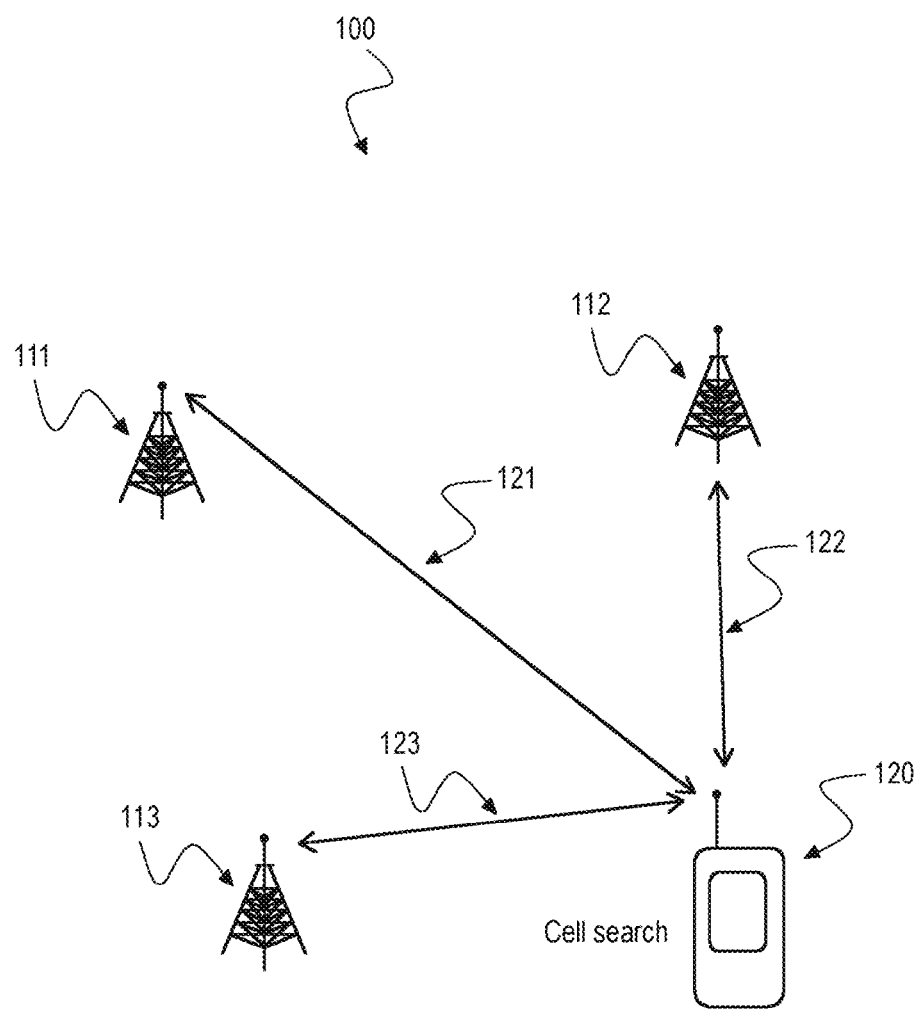
FIG. 1 is a schematic diagram illustrating a communication system 100 with a mobile device 120 initiating radio cell selection between radio cells 111, 112, 113 configured for different RATS.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
RAT: radio access technology,
IRAT: Inter RAT,
SI2quarter: 2G system information 2 quarter message,
UMTS: Universal Mobile Telecommunication System
GSM: Global System for Mobile Communications
UTRA: UMTS Terrestrial Radio Access
EUTRA: evolved UMTS Terrestrial Radio Access
LTE: Long Term Evolution
UE: User Equipment, mobile device, cellular handset
IMS: IP multimedia subsystem
SRVCC: Single Radio Voice Call Continuity
CS: circuit switched
CSFB: circuit switched fallback
2G/3G/4G: $2^{nd}/3^{rd}/4^{th}$ Generation
PLMN: Public Land Mobile Network It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as LTE, in particular LTE-A and/or OFDM and successor standards such as 5G. The methods are also applicable for high speed communication standards from the 802.11 family according to the WiFi alliance, e.g. 802.11ad and successor standards. The methods and devices described below may be implemented in electronic devices such as cellular handsets, mobile or wireless devices (or mobile stations or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

The basic principle of systems described hereinafter is as follows: Whenever the UE is successfully camped on a suitable cell, it will store the latest predefined number of cell information along with their reselection thresholds, priority and PLMN (public land mobile network) values after acquiring these for both serving cell and its neighbor cells from their respective system information messages. And upon detecting any of the scenario where the neighbor cell list is not configured for high priority RAT, UE will perform self-configured measurements on previously stored cells and may follow the default defined reselection algorithms, e.g. as defined in 3GPP, in particular TS 45.008 (V9.4.0, 2010-10), chapter 6.6.6. Advantages are improved time in the preferred RAT, i.e. a RAT with good throughput, and thus a better user experience.

Figure 2:
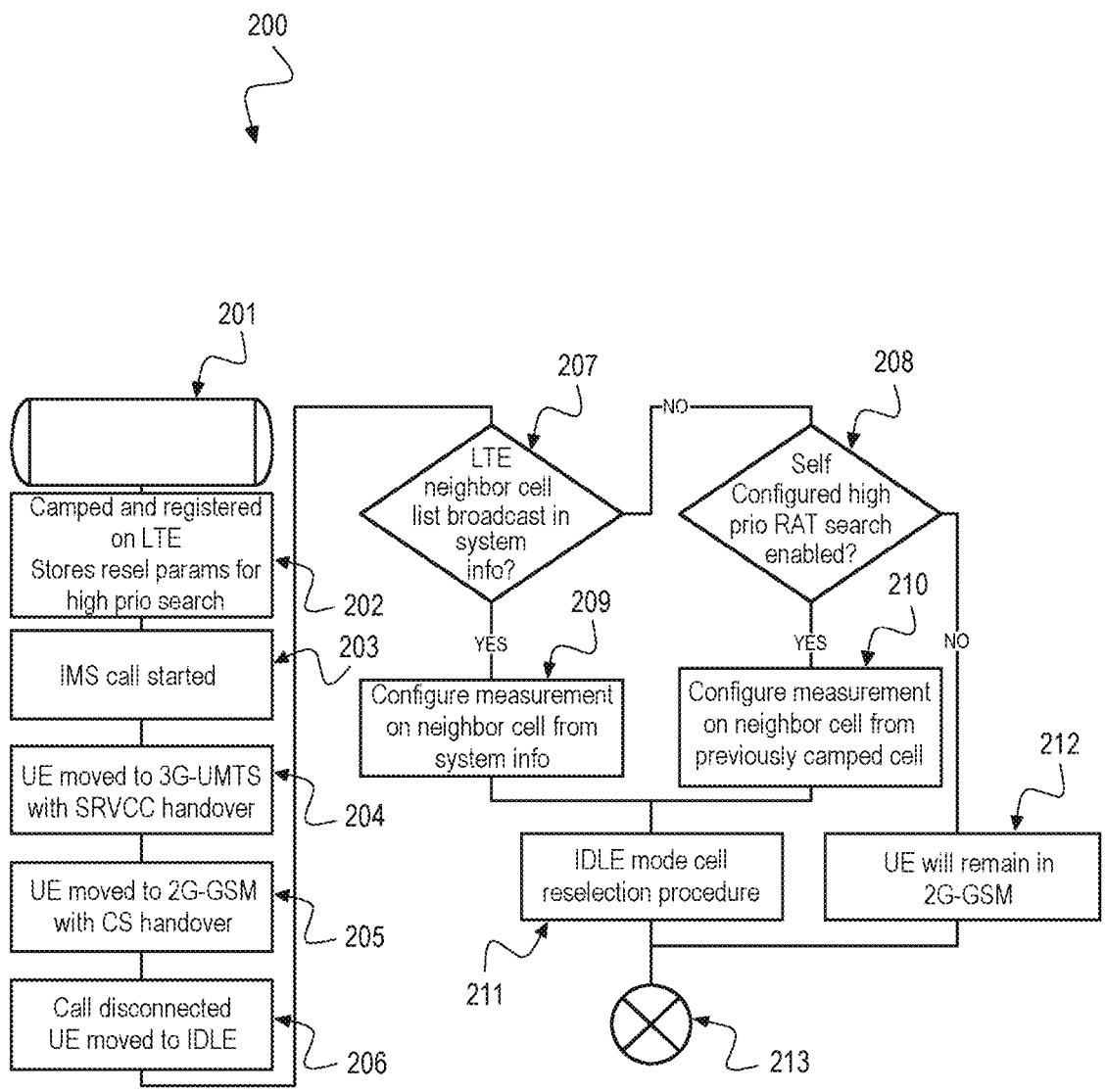
FIG. 2 is a flow chart of an exemplary method 200 for radio cell selection in which a preferred RAT order is LTE-UMTS-GSM and LTE neighboring cells are not configured in 2G-GSM.

FIG. 2 is a flow chart of an exemplary method 200 for radio cell selection in which a preferred RAT order is LTE-UMTS-GSM and LTE neighboring cells are not configured in 2G-GSM.

When the method 200 is invoked 201, the UE is camped and registered on an LTE cell. EUTRA-AS stores its own reselection thresholds, priorities and PLMN information related to serving frequency and neighbor frequencies for high priority search according to block 202. When an IMS call is started (block 203), UE moved to 3G-UMTS cell with SRVCC (Single Radio Voice Call Continuity) handover (block 204). At next block 205, UE moved to 2G-GSM cell with CS (circuit-switched) handover. When the call is disconnected, UE moved to IDLE state (block 206). In this IDLE state UE can perform cell search measurements for which a neighbor cell list is required. Hence, UE checks in block 207 if an LTE neighbor cell list, i.e. a neighbor cell list including cells which are capable of LTE RAT, is broadcast in system information. If such an LTE neighbor cell list is available, UE can configure measurement on neighbor cell from system information, i.e. by using this LTE neighbor cell list (see block 209). However, if such an LTE neighbor cell list is not available, UE checks if self-configured high priority RAT search is enabled, i.e. if UE stores its own list from previously camped cells according to the concept of the disclosure (see block 208).

If self-configured high priority RAT search is enabled, UE can configure measurement on neighbor cell from previously camped cell, i.e. from its own LTE neighbor cell list (see block 210). However, if self-configured high priority RAT search is not enabled, UE will remain in 2G-GSM (block 212) if high-priority RAT neighbor cell information not provided in System Information Broadcast of service cell. For both cases that a neighbor cell list is available, either broadcast from system information according to block 207 or obtained from self-configuration according to block 208, UE performs IDLE mode cell re-selection procedure (block 211) before the method 200 ends 213.

The exemplary implementation of FIG. 2 provides a mechanism to return to high priority/preferred RAT from a low priority/non-preferred RAT cell when such cells are available but the network didn't configure IRAT neighbor cells in system information. Currently any such mechanism is not provided in the 3GPP standards. The scenario in the flowchart of FIG. 2 shows difference between the UE behavior with and without the disclosed solution. The flowchart of FIG. 2 explains the exemplary scenario where the preferred RAT order is LTE-UMTS-GSM and in 2G-GSM, LTE neighboring cells are not configured. The disclosed solution is not limited to the RAT combination shown in FIG. 2. Any other high priority, i.e. preferred RAT and low priority, i.e. non-preferred RAT may be applied.

Figure 3:
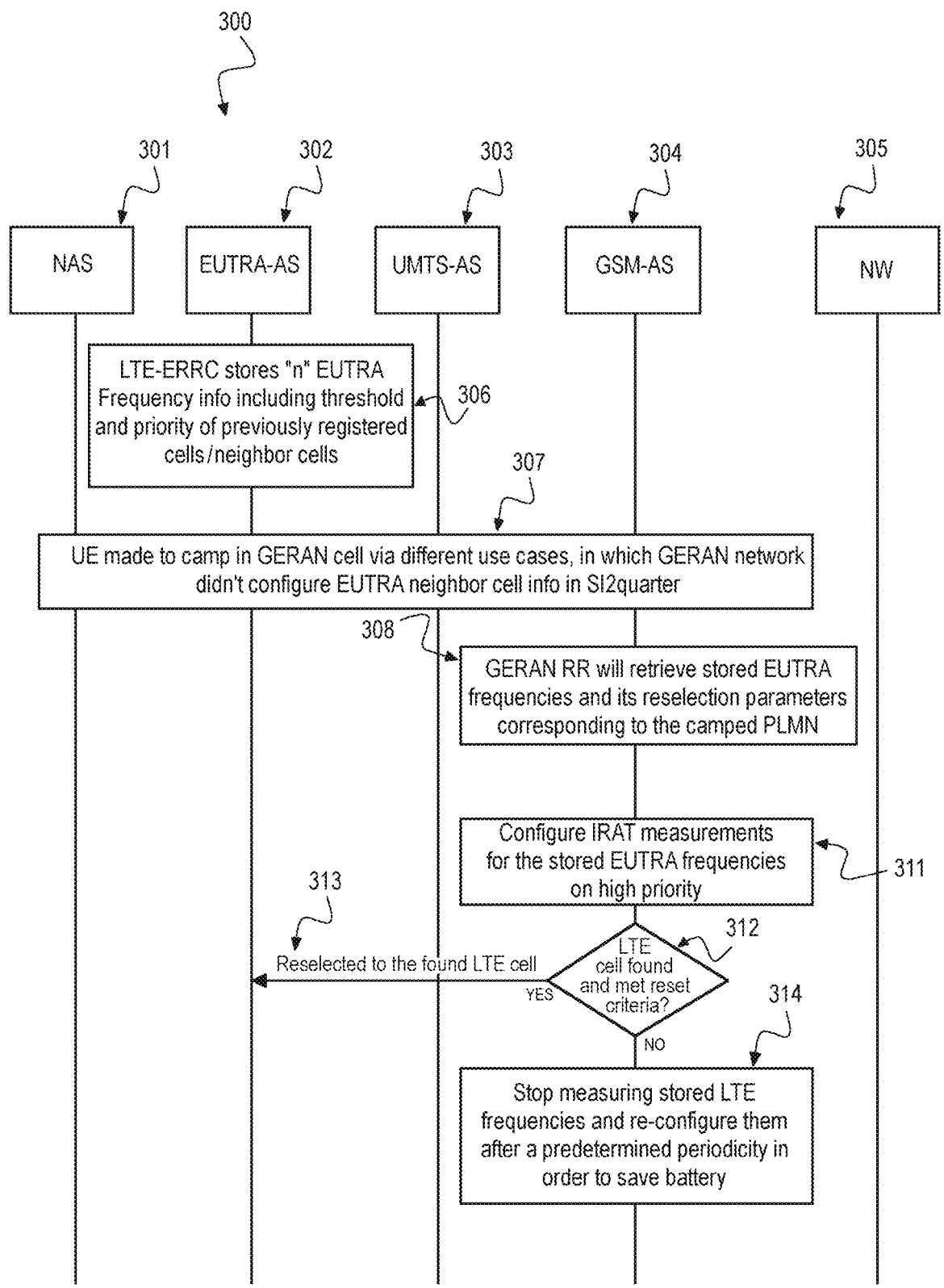
FIG. 3 is a flow chart of an exemplary message protocol sequence 300 for a UE with LTE preference camped on GERAN cell.

FIG. 3 is a flow chart of an exemplary message protocol sequence 300 for a UE with LTE preference camped on GERAN cell.

Different user equipment entities are shown: A non access stratum (NAS) 301, an EUTRA access stratum 302, a UMTS access stratum 303, a GSM access stratum 304 and the network (NW) 305.

The non access stratum (NAS) 301 is a 3GPP defined protocol layer that helps UE to register with Network and access services via multiple available access stratum. A non access stratum 301 has interfaces to multiple access stratum, i.e. to EUTRA access stratum 302, UMTS access stratum 303, GSM access stratum 304.

In the exemplary implementation of FIG. 3, the UE NAS has access to the network 305 via EUTRA-AS 302 or GSM-AS 304 or via UMTS-AS.

At an initial stage, the UE has access to EUTRA cell via EUTRA-AS 302, where LTE-ERRC radio resource control stores an exemplary number of "n" EUTRA frequency entries with information about thresholds and priorities of previously registered cells or neighbor cells (block 306). Depending on different use cases as described below, the UE may be made to camp on a GERAN cell connecting to the GSM-AS 304. In this GERAN network no EUTRA neighbor cell information is configured in system information, i.e. in SI2quarter information (block 307).

GERAN radio resource (RR) will retrieve the stored EUTRAN frequency list specific to the camped PLMN, i.e. from the neighbor cell list stored in block 306 (block 308). Using this stored EUTRAN frequency list, UE will configure IRAT measurements on these high priority EUTRA frequencies (block 311). If then an LTE cell is found and the specific reselection criteria are met by this LTE cell (block 312), UE can reselect the found LTE cell (sequence 313) and connect to the EUTRA-AS 302. Otherwise (block 312), UE may stop measuring the stored LTE frequencies and may re-configure them after a pre-determined periodicity in order to save battery power (block 314).

As can be seen from the message protocol sequence 300 of FIG. 3, that represents a live network log, a UE with LTE preference (RAT preference order 4G-3G-2G) is reselected from LTE and camped on GERAN cell. But as that cell has no LTE neighbor cells in broadcast information, the UE is not able to move back to LTE even when it knows that suitable LTE cells are available. There are multiple ways how an UE can camp on a GERAN cell which is not configured with LTE neighbor cells. The following are a few of possible cases.

1. UE can be chosen to camp on GERAN cell via cell selection.
2. UE can be re-selected to GERAN cell via IRAT reselection from other RATS.
3. During SRVCC, network may move to a GERAN cell (which does not have EUTRAN neighbor cells in its SI2Quarter information) by means of an IRAT handover.

4. During a CSFB call, network may redirect to a UTRAN cell and during the CS Call, the UE may move to a GERAN Cell (which does not have EUTRAN neighbor cells in its SI2Quarter information) by means of an IRAT handover.

5. Extended Service Request is sent by UE for a CSFB call and if network does not provide redirection info in the Connection Release or T3417ext counter expires then UE may move to such a GERAN cell in order to perform the CS Call.

When implementing the solution according to this disclosure, after camping in such a GERAN cell, UE can retrieve the stored EUTRAN frequencies specific to the camped PLMN and then configure them for performing EUTRAN IRAT measurements and apply higher priority based reselection algorithm to reselect to a suitable EUTRAN cell if available.

As UE stores all necessary information including the thresholds and priority data, UE can only reselect to LTE when the corresponding reselection criteria (e.g. according to 3GPP) is actually met. Hence, such a UE can avoid a Ping-Pong reselection to/from LTE and thereby achieving stability.

Due to mobility when even the stored LTE frequencies do not yield good measurements for reselection, UE can stop configuring these frequencies for measurements and may re-configure with a pre-defined periodicity in order to save battery. The stored list data base can be maintained across power cycles, hence even after the next boot up, when UE camped in 2G, the list can be used to reselect to LTE.

Figure 4:
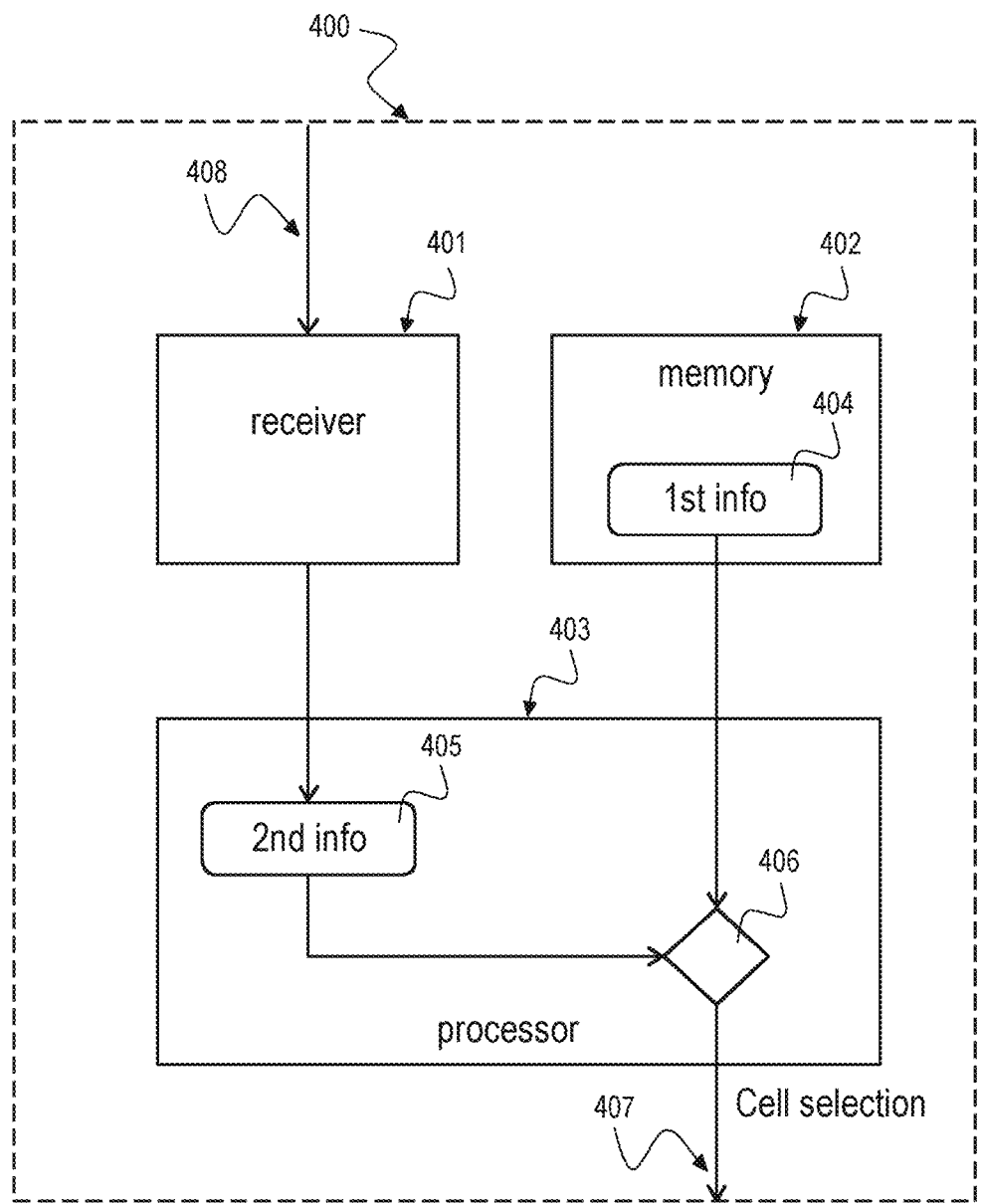
FIG. 4 is a block diagram of a mobile device 400 according to the disclosure.

FIG. 4 is a block diagram of a mobile device 400 according to the disclosure.

The mobile device 400 includes a receiver 401, an optional memory 402 and a processor 403, e.g. a baseband (BB) processor. The receiver 401 is configured to receive a radio signal 408 comprising transmissions from a plurality of radio cells, e.g. transmissions 121, 122, 123 from radio cells 111, 112, 113 as shown in FIG. 1. The optional memory 402 is configured to store first information 404 indicating at least one neighboring radio cell which is configured for a first radio access technology (RAT). Note that the first information does not need to be stored in a memory. The first information can be predetermined, i.e. known by the processor 403. The processor 403 is configured to derive second information 405 from the received radio signal 408. The second information 405 indicates at least one neighboring radio cell. The processor 403 is configured to initiate a radio cell selection 407 based on the second information 405 if 406 the second information 405 indicates at least one neighboring radio cell configured for the first RAT. Alternatively, the processor 403 can initiate the radio cell selection based on the predetermined first information if the second information does not provide information about a neighboring radio cell which is configured for the first RAT.

The processor 403 may implement one of the methods 200, 300 described above with respect to FIGS. 2 and 3. The first information 404 may include the stored neighbor cell list according to blocks 208, 210 in FIG. 2 or according to block 306 in FIG. 3. The second information 405 may include the neighbor cell list received from the system information comprised in the received radio signal 408, e.g. according to block 209 in FIG. 2 or according to SI2quarter information in blocks 307, 308 in FIG. 3.

The second information 405 may indicate one or more neighboring radio cells which are configured for a second RAT.

The one or more neighboring radio cells which are configured for the first RAT may be radio cells according to a first mobile communication standard supporting both, the first RAT and the second RAT, e.g. GSM and LTE as described above with respect to FIG. 3.

The one or more neighboring radio cells which are configured for the second RAT may be radio cells according to a second mobile communication standard which only support the second RAT and not the first RAT, e.g. only GSM and not LTE according to the description with respect to FIG. 3.

The one or more neighboring radio cells which are configured for the first RAT may be assigned to a first priority. The one or more neighboring radio cells which are configured for the second RAT may be assigned to a second priority. In one example, the first priority is higher than the second priority.

The processor 403 may be configured to derive the second information 405 from an inter-RAT neighbor cell list comprised in system information of a broadcast channel of a respective radio cell.

The processor 403 may be configured to update the first information 404 stored in the memory 402 based on the second information 405 derived from the received radio signal 408 if the second information 405 indicates at least one radio cell which is configured for the first RAT.

The second information 405 may include frequency information, threshold information and priority information of the one or more neighboring radio cells.

The processor 403 may be configured to initiate the radio cell selection when the mobile device is camping on a radio cell which is configured for a RAT that is different from the first RAT.

The processor 403 may be configured to initiate the radio cell selection when the mobile device is in an idle mode.

The first information 404 may be stored in a section of the memory which is maintained across power cycles, i.e. a power-off resistant section of the memory.

The processor 403 may be configured to stop initiating the radio cell selection if the radio cell selection based on the first information 404 is not enabled and the second information 405 indicates no neighboring radio cell configured for the first RAT, e.g. as described in block 314 of FIG. 3.

The processor 403 may be configured to reconfigure the first information 404 stored in the memory 402 with the second information 405 which is derived from the received radio signal 408 after a predetermined time period. This may ensure that the first information 404 stored in the memory 402 indicates the latest radio cell environment.

The memory 402 may store a layer 3 protocol stack controlling the processor 403 to initiate the radio cell selection.

Figure 5:
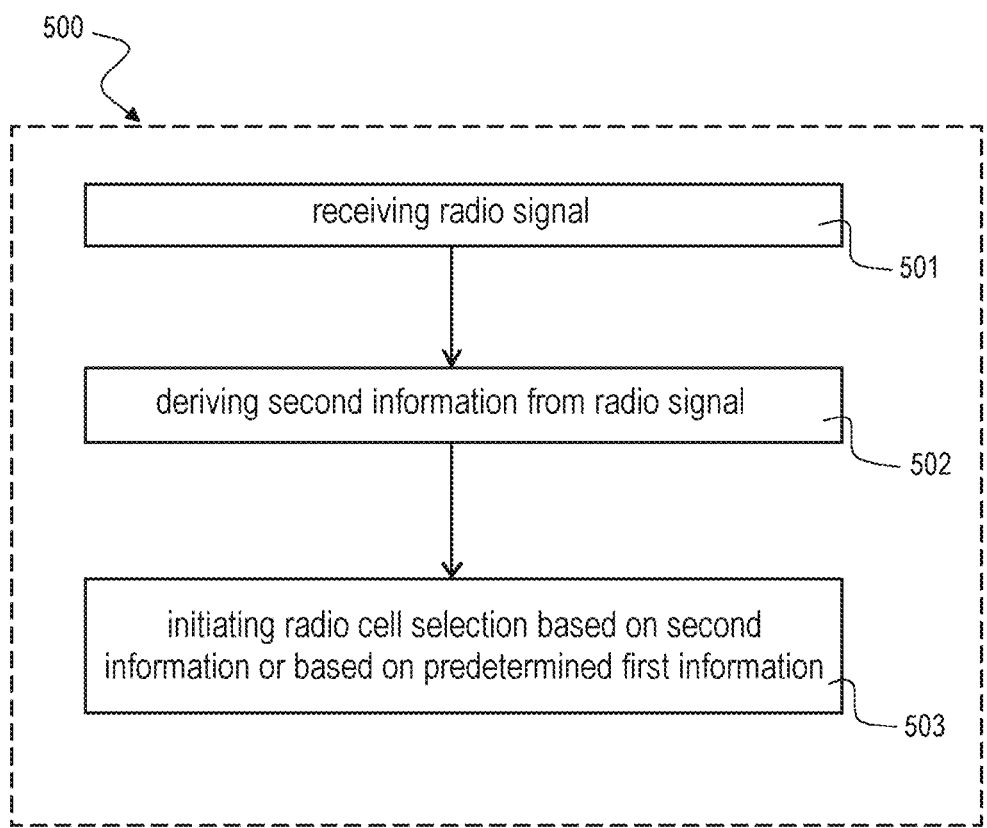
FIG. 5 is a schematic diagram of a method 500 for initiating a radio cell selection according to the disclosure.

FIG. 5 is a schematic diagram of a method 500 for initiating a radio cell selection according to the disclosure. The method 500 may for example be implemented on a processor 403 as described above with respect to FIG. 4 or on any other computer.

The method 500 includes: receiving 501 a radio signal, e.g. a radio signal 408 as shown in FIG. 4, comprising transmissions from a plurality of radio cells, e.g. radio cells 111, 112, 113 as shown in FIG. 1.

The method 500 includes: deriving 502 second information from the received radio signal, e.g. second information 405 as described above with respect to FIG. 4, the second information indicating at least one neighboring radio cell.

The method 500 further includes: initiating 503 a radio cell selection based on the second information 405 if the second information indicates at least one radio cell configured for a first radio access technology (RAT), otherwise based on predetermined first information, e.g. first information 404 as described above with respect to FIG. 4, indicating at least one neighboring radio cell which is configured for the first RAT.

The second information may indicate at least one neighboring radio cell configured for a second RAT. The at least one neighboring radio cell which is configured for the first RAT may be a radio cell according to a first mobile communication standard supporting both, the first RAT and the second RAT.

The at least one neighboring radio cell configured for the second RAT may be a radio cell according to a second mobile communication standard only supporting the second RAT, i.e. not supporting the first RAT.

The at least one neighboring radio cell which is configured for the first RAT may be assigned to a first priority; the at least one neighboring radio cell configured for the second RAT may be assigned to a second priority, wherein the first priority is higher than the second priority.

The method 500 may further comprise: deriving the second information from an inter-RAT neighbor cell list comprised in system information of a broadcast channel of a respective radio cell. The method 500 may further comprise: updating the first information stored in the memory based on the second information derived from the received radio signal if the second information indicates at least one radio cell configured for the first RAT.

The second information may include frequency information, threshold information and priority information of the at least one neighboring radio cell.

The method 500 may further comprise: initiating the radio cell selection when the mobile device is camping on a radio cell which is configured for a RAT different from the first RAT. The method 500 may further comprise: initiating the radio cell selection when the mobile device is in an idle mode. The first information may be stored in a section of the memory which is maintained across power cycles.

The method 500 may further comprise: stopping initiating the radio cell selection if the radio cell selection based on the first information is not enabled and the second information indicates no neighboring radio cell configured for the first RAT, e.g. according to block 314 described above with respect to FIG. 3.

The method 500 may further comprise: reconfiguring the first information stored in the memory with the second information derived from the received radio signal after a predetermined time period. The method 500 may further comprise: storing a layer 3 protocol stack which is configured to control the processor to initiate the radio cell selection.

A method for connecting a mobile device to a radio cell (not depicted) includes: receiving a radio signal comprising transmissions from a plurality of radio cells, e.g. radio cells 111, 112, 113 as described above with respect to FIG. 1; connecting the mobile device to a first radio cell based on predetermined first information indicating at least one neighboring radio cell which is configured for a first radio access technology (RAT); deriving second information from the received radio signal, the second information indicating at least one neighboring radio cell; and connecting the mobile device to a second radio cell based on the second information if the second information indicates at least one radio cell configured for the first RAT, otherwise based on the first information. The first information may correspond to the first information 404 as described above with respect to FIG. 4. The second information may correspond to the second information 405 as described above with respect to FIG. 4.

The method may further include: disconnecting the mobile device from the first radio cell before connecting the mobile device to the second radio cell. The first information may be stored in a memory. The second information may indicates at least one neighboring radio cell configured for a second RAT. The at least one neighboring radio cell configured for the first RAT may be a radio cell according to a first mobile communication standard supporting both, the first RAT and the second RAT. The at least one neighboring radio cell configured for the second RAT may be a radio cell according to a second mobile communication standard only supporting the second RAT, e.g. as described above with respect to FIGS. 3 and 4.

The at least one neighboring radio cell configured for the first RAT may be assigned to a first priority, and the at least one neighboring radio cell configured for the second RAT may be assigned to a second priority, wherein the first priority is higher than the second priority.

The method may further include: deriving the second information from an inter-RAT neighbor cell list comprised in system information of a broadcast channel of a respective radio cell. The method may further include: updating the first information stored in the memory based on the second information derived from the received radio signal if the second information indicates at least one radio cell configured for the first RAT. The second information may include frequency information, threshold information and priority information of the at least one neighboring radio cell.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 200, 300, 500 described above with respect to FIGS. 2, 3 and 5 and the computing blocks described above with respect to FIG. 4. Such a computer program product may include a non-transient readable storage medium storing program code thereon for use by a processor, the program code comprising instructions for performing the methods or the computing blocks as described above.

EXAMPLES

The following examples pertain to further embodiments. Example 1 is a mobile device, comprising: a receiver configured to receive a radio signal comprising transmissions from a plurality of radio cells; and a processor configured to derive second information from the received radio signal, the second information indicating at least one neighboring radio cell, wherein the processor is configured to initiate a radio cell selection based on the second information if the second information indicates at least one neighboring radio cell configured for a first radio access technology (RAT).

In Example 2, the subject matter of Example 1 can optionally include that the processor is configured to initiate the radio cell selection based on predetermined first information if the second information does not provide information about a neighboring radio cell which is configured for the first RAT.

In Example 3, the subject matter of Example 2 can optionally include that the second information indicates at least one neighboring radio cell configured for a second RAT.

In Example 4, the subject matter of Example 3 can optionally include that the at least one neighboring radio cell configured for the first RAT is a radio cell according to a first mobile communication standard supporting both, the first RAT and the second RAT.

In Example 5, the subject matter of any one of Examples 3-4 can optionally include that the at least one neighboring radio cell configured for the second RAT is a radio cell according to a second mobile communication standard only supporting the second RAT.

In Example 6, the subject matter of any one of Examples 3-5 can optionally include that the at least one neighboring radio cell configured for the first RAT is assigned to a first priority, wherein the at least one neighboring radio cell configured for the second RAT is assigned to a second priority, wherein the first priority is higher than the second priority.

In Example 7, the subject matter of any one of Examples 1-5 can optionally include that the processor is configured to derive the second information from an inter-RAT neighbor cell list comprised in system information of a broadcast channel of a respective radio cell.

In Example 8, the subject matter of any one of Examples 2-7 can optionally include that the processor is configured to update the first information based on the second information derived from the received radio signal if the second information indicates at least one radio cell configured for the first RAT.

In Example 9, the subject matter of any one of Examples 1-8 can optionally include that the second information comprises frequency information, threshold information and priority information of the at least one neighboring radio cell.

In Example 10, the subject matter of any one of Examples 1-9 can optionally include that the processor is configured to initiate the radio cell selection when the mobile device is camping on a radio cell which is configured for a RAT different from the first RAT.

In Example 11, the subject matter of any one of Examples 1-10 can optionally include that the first information is stored in a memory section which is maintained across power cycles.

In Example 12, the subject matter of any one of Examples 1-11 can optionally include that the processor is configured to stop initiating the radio cell selection if the radio cell selection based on the first information is not enabled and the second information indicates no neighboring radio cell configured for the first RAT.

In Example 13, the subject matter of Example 12 can optionally include that the processor is configured to reconfigure the first information with the second information derived from the received radio signal after a predetermined time period.

In Example 14, the subject matter of any one of Examples 1-13 can optionally include a layer 3 protocol stack controlling the processor to initiate the radio cell selection.

Example 15 is a method for initiating a radio cell selection, the method comprising: receiving a radio signal comprising transmissions from a plurality of radio cells; deriving second information from the received radio signal, the second information indicating at least one neighboring radio cell; and initiating a radio cell selection based on the second information if the second information indicates at least one radio cell configured for a first radio access technology (RAT), otherwise based on predetermined first information indicating at least one neighboring radio cell which is configured for the first RAT.

In Example 16, the subject matter of Example 15 can optionally include that the second information indicates at least one neighboring radio cell configured for a second RAT.

In Example 17, the subject matter of Example 16 can optionally include that the at least one neighboring radio cell configured for the first RAT is a radio cell according to a first mobile communication standard supporting both, the first RAT and the second RAT.

In Example 18, the subject matter of any one of Examples 16-17 can optionally include that the at least one neighboring radio cell configured for the second RAT is a radio cell according to a second mobile communication standard only supporting the second RAT.

In Example 19, the subject matter of any one of Examples 16-18 can optionally include that the at least one neighboring radio cell configured for the first RAT is assigned to a first priority, wherein the at least one neighboring radio cell configured for the second RAT is assigned to a second priority, wherein the first priority is higher than the second priority.

In Example 20, the subject matter of any one of Examples 15-19 can optionally include: deriving the second information from an inter-RAT neighbor cell list comprised in system information of a broadcast channel of a respective radio cell.

In Example 21, the subject matter of any one of Examples 15-20 can optionally include: updating the first information based on the second information derived from the received radio signal if the second information indicates at least one radio cell configured for the first RAT.

In Example 22, the subject matter of any one of Examples 15-21 can optionally include that the second information comprises frequency information, threshold information and priority information of the at least one neighboring radio cell.

In Example 23, the subject matter of any one of Examples 15-22 can optionally include: initiating the radio cell selection when the mobile device is camping on a radio cell which is configured for a RAT different from the first RAT.

In Example 24, the subject matter of any one of Examples 15-23 can optionally include: initiating the radio cell selection when the mobile device is in an idle mode.

In Example 25, the subject matter of any one of Examples 15-24 can optionally include that the first information is stored in a memory section which is maintained across power cycles.

In Example 26, the subject matter of any one of Examples 15-25 can optionally include: stopping initiating the radio cell selection if the radio cell selection based on the first information is not enabled and the second information indicates no neighboring radio cell configured for the first RAT.

In Example 27, the subject matter of Example 26 can optionally include: reconfiguring the first information with the second information derived from the received radio signal after a predetermined time period.

In Example 28, the subject matter of any one of Examples 15-27 can optionally include: storing a layer 3 protocol stack which is configured to control the processor to initiate the radio cell selection.

Example 29 is a method for connecting a mobile device to a radio cell, the method comprising: receiving a radio signal comprising transmissions from a plurality of radio cells; connecting the mobile device to a first radio cell based on predetermined first information indicating at least one neighboring radio cell which is configured for a first radio access technology (RAT); deriving second information from the received radio signal, the second information indicating at least one neighboring radio cell; and connecting the mobile device to a second radio cell based on the second information if the second information indicates at least one radio cell configured for the first RAT, otherwise based on the first information.

In Example 30, the subject matter of Example 29 can optionally include: disconnecting the mobile device from the first radio cell before connecting the mobile device to the second radio cell.

In Example 31, the subject matter of any one of Examples 29-30 can optionally include that the first information is stored in a memory.

In Example 32, the subject matter of any one of Examples 29-31 can optionally include that the second information indicates at least one neighboring radio cell configured for a second RAT.

In Example 33, the subject matter of Example 32 can optionally include that the at least one neighboring radio cell configured for the first RAT is a radio cell according to a first mobile communication standard supporting both, the first RAT and the second RAT.

In Example 34, the subject matter of any one of Examples 32-33 can optionally include that the at least one neighboring radio cell configured for the second RAT is a radio cell according to a second mobile communication standard only supporting the second RAT.

In Example 35, the subject matter of any one of Examples 32-34 can optionally include that the at least one neighboring radio cell configured for the first RAT is assigned to a first priority, wherein the at least one neighboring radio cell configured for the second RAT is assigned to a second priority, wherein the first priority is higher than the second priority.

In Example 36, the subject matter of any one of Examples 29-35 can optionally include: deriving the second information from an inter-RAT neighbor cell list comprised in system information of a broadcast channel of a respective radio cell.

In Example 37, the subject matter of any one of Examples 29-36 can optionally include: updating the first information based on the second information derived from the received radio signal if the second information indicates at least one radio cell configured for the first RAT.

In Example 38, the subject matter of any one of Examples 29-37 can optionally include that the second information comprises frequency information, threshold information and priority information of the at least one neighboring radio cell.

Example 39 is a device for initiating a radio cell selection, the device comprising: means for receiving a radio signal comprising transmissions from a plurality of radio cells; means for deriving second information from the received radio signal, the second information indicating at least one neighboring radio cell; and means for initiating a radio cell selection based on the second information if the second information indicates at least one radio cell configured for a first radio access technology (RAT), otherwise based on predetermined first information indicating at least one neighboring radio cell which is configured for the first RAT.

In Example 40, the subject matter of Example 39 can optionally include that the second information indicates at least one neighboring radio cell configured for a second RAT.

Example 41 is a communication system, comprising: a receiver component configured to: receive a radio signal comprising transmissions from a plurality of radio cells; a connection component configured to connect to a first radio cell based on predetermined first information indicating at least one neighboring radio cell which is configured for a first radio access technology (RAT); and a processing component configured to derive second information from the received radio signal, the second information indicating at least one neighboring radio cell, wherein the connection component is configured to connect to a second radio cell based on the second information if the second information indicates at least one radio cell configured for the first RAT, otherwise based on the first information.

In Example 42, the subject matter of Example 41 can optionally include that the first information is stored in a memory section which is maintained across power cycles.

In Example 43, the subject matter of any one of Examples 41-42 can optionally include that the second information indicates at least one neighboring radio cell configured for a second RAT.

Example 44 is a computer readable non-transitory medium on which computer instructions are stored which when executed by a computer cause the computer to perform the method of any one of Examples 15 to 38.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:
1. A device, comprising:
a receiver configured to receive a radio signal comprising transmissions from a plurality of radio cells; and a processor configured to determine, from the received radio signal, second information indicating at least one neighboring radio cell, and to initiate a radio cell selection
(i) based on the second information when the second information indicates at least one neighboring radio cell configured for a first radio access technology (RAT), or
(ii) based on first information in an absence of the second information indicating a neighboring radio cell that is configured for the first RAT.

2. The device of claim 1, wherein the first information is predetermined.

3. The device of claim 1, wherein the second information indicates at least one neighboring radio cell configured for a second RAT.

4. The device of claim 3, wherein the at least one neighboring radio cell configured for the first RAT is a radio cell according to a first mobile communication standard supporting the first RAT and the second RAT.

5. The device of claim 3, wherein the at least one neighboring radio cell configured for the second RAT is a radio cell according to a second mobile communication standard supporting the second RAT.

6. The device of claim 3, wherein:
the at least one neighboring radio cell configured for the first RAT is assigned a first priority,
the at least one neighboring radio cell configured for the second RAT is assigned to a second priority, and
the first priority is higher than the second priority.

7. The device of claim 1, wherein the processor is configured to determine the second information from an inter-RAT neighbor cell list included as part of system information of a broadcast channel of a respective radio cell.

8. The device of claim 1, wherein the processor is configured to update the first information based on the second information determined from the received radio signal when the second information indicates at least one radio cell configured for the first RAT.

9. The device of claim 1, wherein the second information comprises frequency information, threshold information, and priority information of the at least one neighboring radio cell.

10. The device of claim 1, wherein the processor is configured to initiate the radio cell selection when the mobile device is camping on a radio cell that is configured for a RAT different from the first RAT.

11. The device of claim 1, wherein the first information is stored in a memory and is maintained across power cycles of the device.

12. The device of claim 1, wherein the processor is configured to stop initiating the radio cell selection when the radio cell selection based on the first information is not enabled and the second information indicates no neighboring radio cell configured for the first RAT.

13. The device of claim 12, wherein the processor is configured to reconfigure the first information with the second information determined from the received radio signal after a predetermined time period.

14. The device of claim 1, wherein the processor is controlled via a layer 3 protocol stack to initiate the radio cell selection.

15. A method for initiating a radio cell selection, comprising:
receiving a radio signal comprising transmissions from a plurality of radio cells;
determining, from the received radio signal, second information indicating at least one neighboring radio cell; and
initiating a radio cell selection
(i) based on the second information when the second information indicates at least one neighboring radio cell configured for a first radio access technology (RAT), or
(ii) based on first information in an absence of the second information indicating a neighboring radio cell that is configured for the first RAT.

16. The method of claim 15, wherein the second information indicates at least one neighboring radio cell configured for a second RAT.

17. The method of claim 16, wherein the at least one neighboring radio cell configured for the first RAT is a radio cell according to a first mobile communication standard supporting the first RAT and the second RAT.

18. The method of claim 16, wherein the at least one neighboring radio cell configured for the second RAT is a radio cell according to a second mobile communication standard supporting the second RAT.

19. The method of claim 16, wherein:
the at least one neighboring radio cell configured for the first RAT is assigned a first priority,
the at least one neighboring radio cell configured for the second RAT is assigned a second priority, and
the first priority is higher than the second priority.

20. The method of claim 15, wherein the act of determining the second information includes determining the second information from an inter-RAT neighbor cell list included as part of system information of a broadcast channel of a respective radio cell.

21. The method of claim 15, further comprising: updating the first information based on the second information determined from the received radio signal when the second information indicates at least one radio cell configured for the first RAT.

22. A method for connecting a mobile device to a radio cell, the method comprising:
receiving a radio signal comprising transmissions from a plurality of radio cells;
connecting the mobile device to a first radio cell based on first information indicating at least one neighboring radio cell that is configured for a first radio access technology (RAT);
determining, from the received radio signal, second information indicating at least one neighboring radio cell; and
connecting the mobile device to a second radio cell (i) based on the second information when the second information indicates at least one neighboring radio cell configured for a first radio access technology (RAT), or
(ii) based on the first information in an absence of the second information indicating a neighboring radio cell that is configured for the first RAT.

23. The method of claim 22, further comprising:
disconnecting the mobile device from the first radio cell before connecting the mobile device to the second radio cell.

24. The method of claim 22, wherein the first information is stored in a memory.

25. The method of claim 22, wherein the second information indicates at least one neighboring radio cell configured for a second RAT.

* * * * *